United States Patent [19]
Deal et al.

[11] 4,016,363
[45] Apr. 5, 1977

[54] METHOD FOR ADHERING COMPONENTS PLATFORM TO CATHODE-RAY TUBE AND PRODUCT THEREOF

[75] Inventors: Samuel Broughton Deal, Lancaster; Donald Walter Bartch, Columbia, both of Pa.

[73] Assignee: RCA Corporation, New York, N.Y.

[22] Filed: Mar. 15, 1976

[21] Appl. No.: 667,109

[52] U.S. Cl. .................... 358/248; 335/210
[51] Int. Cl.[2] .................... H04M 5/64
[58] Field of Search .................... 178/7.8, 7.82, 7.85; 335/210; 156/294, 225, 229, 231, 315; 29/25.13

[56] References Cited

UNITED STATES PATENTS

| | | | |
|---|---|---|---|
| 3,306,800 | 2/1967 | Plueddemann | 156/329 |
| 3,629,751 | 12/1971 | Massa | 335/210 |
| 3,637,930 | 2/1972 | Meier | 178/7.8 |
| 3,764,740 | 10/1973 | Deal | 178/7.8 |
| 3,828,287 | 8/1974 | Torsch | 335/210 |
| 3,829,804 | 8/1974 | Aldrich | 178/7.8 |
| 3,863,312 | 2/1975 | Aldrich | 178/7.8 |

*Primary Examiner*—Robert L. Griffin
*Assistant Examiner*—Edward L. Coles
*Attorney, Agent, or Firm*—G. H. Bruestle; L. Greenspan

[57] ABSTRACT

A cathode-ray tube with a platform adhered to the external surface of the tube by at least one mass of solidified thermoplastic adhesive and at least one mass of irreversibly-hardened adhesive. The method includes applying masses of liquid thermoplastic and liquid irreversibly-hardenable masses between the platform and the tube surface, and then solidifying each of the adhesive masses.

6 Claims, 3 Drawing Figures

METHOD FOR ADHERING COMPONENTS PLATFORM TO CATHODE-RAY TUBE AND PRODUCT THEREOF

BACKGROUND OF THE INVENTION

This invention relates to a novel and improved method for adhering a platform to the external surface of a cathode-ray tube, and to the novel product of this method. The platform is employed for mounting one or more components in prescribed positions with respect to the tube.

U.S. Pat. No. 3,786,185 issued Jan. 15, 1974, to T. M. Sharder describes a cathode-ray tube having a platform adhered directly to the external surface of the funnel portion of the tube. The platform is used to mount the deflection yoke in a desired position with respect to the tube. The Shrader patent suggests that the platform may be adhered to the tube surface with either a solidified thermoplastic adhesive such as paraffin or a commercially-available hot-melt adhesive; or an irreversibly-hardened or cured adhesive such as an epoxy resin. As used herein a thermoplastic adhesive is one that is reversibly hardened by physical action; that is, solidified by cooling and liquified by heating. A cured adhesive is one that is irreversibly solidified by chemical reaction.

A thermoplastic adhesive has the advantage that it can be cooled and solidified rapidly permitting relatively fast rates of assembly. However, a thermoplastic adhesive has the disadvantage of slight plastic flow over relatively long periods of tube operation. Also, it is temperature sensitive requiring special considerations during assembly of the platform to the tube and during subsequent handling and usage. An irreversibly-hardened or cured adhesive has the advantages of greater strength and rigidity after curing and relative temperature insensitivity during assembly of the platform to the tube and during subsequent handling and usage. However, an irreversibly-hardened adhesive takes relatively long time periods to cure requiring considerable storage space and handling during assembly.

SUMMARY OF THE INVENTION

The novel method follows the prior method except that at least one liquid thermoplastic mass and at least one liquid irreversibly-hardenable mass are applied between the platform and the tube. The thermoplastic mass is solidified rapidly by cooling providing temporary but adequate adherence and rigidity for the platform. After the thermoplastic mass has solidified, components such as the yoke may be mounted on the platform. After the component has been mounted, the irreversibly-hardenable mass cures over a relatively long time period developing the desired strength, rigidity, and temperature insensitivity.

The novel article is the cathode-ray tube with a platform adhered to the external surface of the tube by separate masses of both solidified thermoplastic and irreversibly-hardened adhesive. In preferred embodiments an annular platform is adhered to the tube with equal pluralities of each adhesive type alternately positioned around the platform.

By using one or more masses of solidified, thermoplastic adhesive, the advantages of rapid cooling and solidification may be realized, permitting fast assembly rates. By using one or more masses of irreversibly-hardened adhesive, the advantages of temperature insensitivity and greater rigidity are realized, imparting greater stability to the assembly during subsequent usage.

DESCRIPTION OF THE PREFERRED EMBODIMENT

Figure 1:
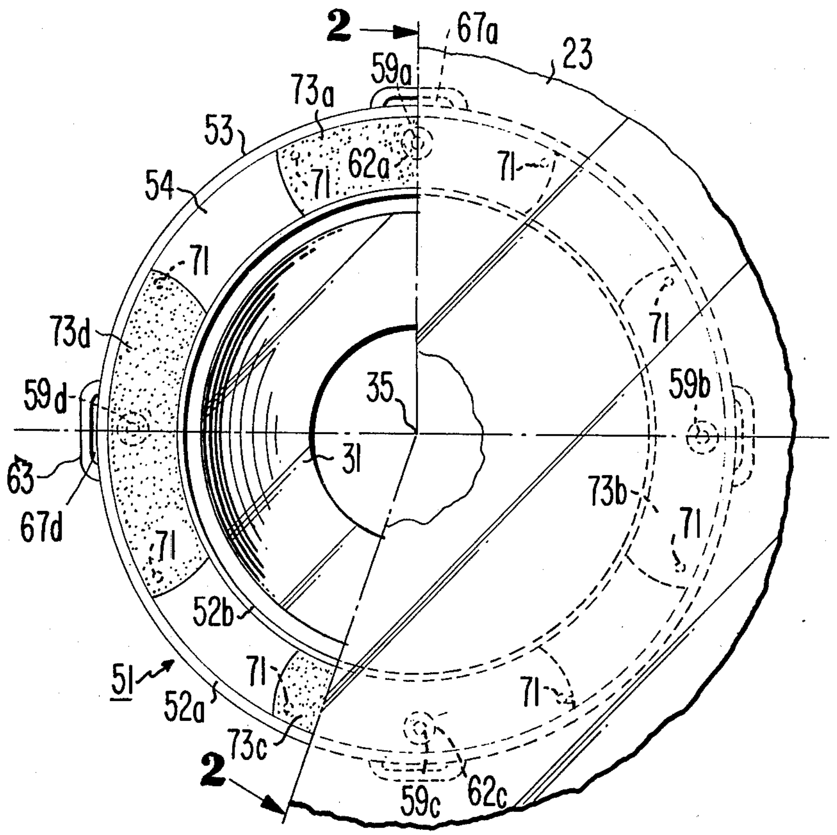
FIG. 1 is an enlarged broken-away view of a portion of an embodiment of the novel article.
Figure 2:
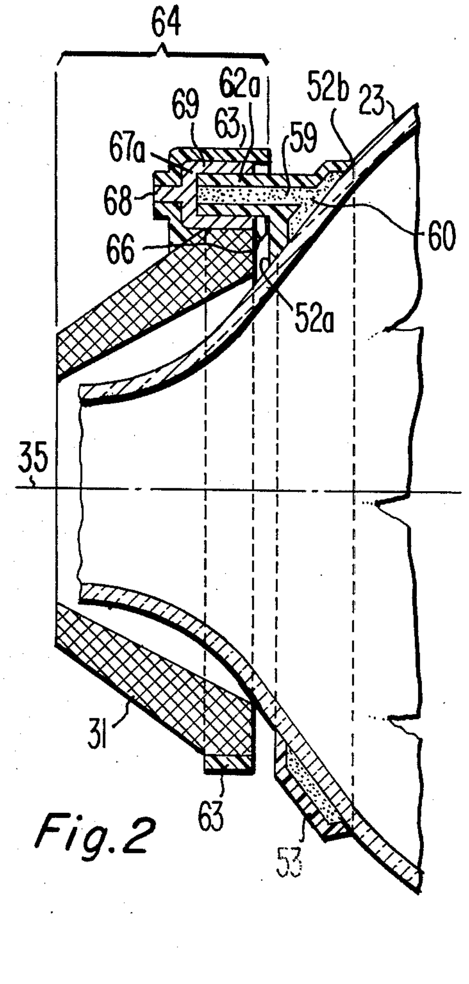
FIG. 2 is a sectional view of the novel article shown in FIG. 1 along section lines 2—2.

The preferred embodiment is described with respect to FIGS. 1 and 2, which is similar to the embodiment shown in FIGS. 4 and 5 respectively of the above-cited Shrader patent except for use of two different adhesives as described herein and also modifications to the design of the funnel ring. The cathode-ray tubes described in Sharder can be used in the novel method and article and are hereby incorporated by reference. Similar reference numerals are used for similar structures in the figures to aid in comparison with and incorporation from the Shrader patent.

Figure 3:
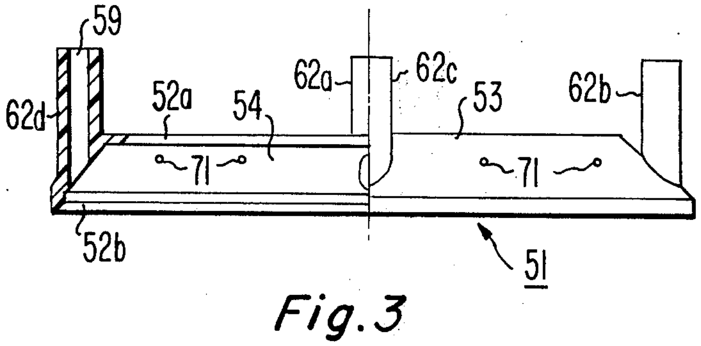
FIG. 3 is a partially-sectional, partially-elevational view of the funnel ring which is adhered to the funnel in the novel article shown in FIG. 1 and 2.

Briefly, however, FIGS. 1 and 2 show a portion of the funnel 23 of an operative cathode-ray tube whose longitudinal axis is designated by the numeral 35. A platform 51 is positioned against the external surface of the funnel 23. The left side of FIG. 1 shows the structure with the funnel 23 removed. The platform 51, which is shown in FIGS. 1, 2 and 3, comprises generally annular ring or base 53 having four upstanding lugs 62*a*, 62*b*, 62*c*, 62*d* extending generally parallel to the tube axis 35 when assembled. The platform 51 is preferably of a plastic, such as Noryl No. SEO-225 or SE-1 marketed by General Electric Company, Schenectady, N. Y.

The annular ring or base 53 includes two annular forward inner surfaces 52*a* and 52*b* generally contoured to conform substantially to the contour of the outer surface of the funnel 23. The ring 53 is positioned on the funnel 23 in a position generally concentric with the neck. The ring 53 has an annular recess 54 between the two inner surfaces. The recess 54 is about 25.4 mm (1.00 inch) wide and varies in depth but is mostly about 1.59 mm (0.063 inch) deep. When positioned on the funnel 23, the recess 54 and the funnel surface form a chamber 60 for liquid adhesive. The annular inner surfaces 52*a* and 52*b* contact the funnel surface forming ring seals for containing the adhesive.

The four lugs 62*a–d* are substantially equally spaced apart from each other on the ring 53. The lengths of the lugs are tailored to the particular application. In one embodiment, each lug is about 8.71 mm (0.343 inch) in diameter and about 18.72 mm (0.737 inch) long. A passageway 59 about 5.08 mm (0.200 inch) in diameter extends through each lug 62*a–d* into the recess 54. Between each adjacent pair of lugs 62*a–d* are two weep holes 71 dividing the distance therebetween into three about-equal parts. The weep holes 71 extend through the wall of the ring into the recess 54.

The platform 51 is positioned against the funnel with the lug 62*a* in the 12 o'clock position and the lug 62*c* in the 6 o'clock position; that is, these lugs correspond to the center of the upper and lower margins of the viewing screen. The recess 54 forms a chamber 60 between the funnel 23 and ring 53. Masses 73*a* and 73*c* of a first irreversibly-hardened or cured adhesive fill the passageways 59*a* and 59*c* of the 12 o'clock and 6 o'clock lugs 62*a* and 62*c* aand the chamber 60 adjacent thereto out to just beyond the closest weep holes 71. Masses 73*b* and 73*d* of a second solidified thermoplastic adhesive fill the passageways 59*b* and 59*d* of the 3 o'clock and 9 o'clock lugs 62*b* and 62*d* and the chamber 60 adjacent thereto out to just beyond the closest weep holes 71.

The platform 51 may be adhered to the funnel 23 in several simple steps. The inner surfaces 52*a* and 52*b* of the ring 53 of the platform 51 are pressed against the surface of the funnel 23 with the ring 53 about concentric with the neck. The lugs 62*b*, 62*c*, 62*d* and 62*a* are opposite the 3, 6, 9 and 12 o'clock positions of the viewing screen of the tube. This forms the chamber 60 for the adhesive.

With the platform held in position, irreversibly-hardenable (uncured) adhesive in liquid form is injected through the passageways 59*a* and 59*c* of the 12 o'clock and 6 o'clock lugs 62*a* and 62*c* filling the chamber 60 adjacent thereto with masses 73*a* and 73*c*. The injection is continued until a small amount of adhesive is seen protruding from the two weep holes 71 nearest the lug. Curing of the masses 73*a* and 73*c* starts immediately and continues for periods of up to 10 days or more.

With the platform still held in position, thermoplastic adhesive in liquid form is injected through the passageways 59*b* and 59*d* of the 3 o'clock and 9 o'clock lugs 62*b* and 62*d* filling the chamber 60 adjacent thereto with masses 73*b* and 73*d*. The injection is continued until a small amount of adhesive is seen protruding from the two weep holes 71 nearest the lug. The thermoplastic masses 73*b* and 73*d* are permitted to cool and solidify spontaneously and/or they may be stimulated to cool and solidify faster as by blowing cool air against the ring 53 or by other methods.

When the thermoplastic masses 73*b* and 73*d* have solidified, which may be of the order of 0.5 to 5.0 minutes, the tube with the platform adhered thereto may be advanced to the next step in manufacture. For example, a yoke may be assembled to the platform by methods and with structures known in the prior art.

One example of a yoke assembly mounted on the platform is shown in FIGS. 1 and 2. A yoke 31 is mounted in a housing 63 to form a yoke assembly 64. The housing 63 comprises a ring-shaped member which includes four retainers (not shown) which conform to a portion of the exterior surface of the yoke 31. The yoke 31 is temporarily maintained against the retainers in a fixed position in the housing 63 by flexible hooks 66. The yoke 31 is permanently fixed in position in the housing by adhesive material 69 between the lugs 62*a–d* and the housing 63.

The housing 63 also includes indentations or troughs 67*a–d* which engage over each of the lugs 62*a–d* respectively. Trough passageways 68 open into the bottom of each of the troughs 67*a–d*. The troughs 67*a–d* are larger than each of their corresponding lugs 62*a–d* to permit adjustment of the position of the housing 63 with respect to the platform 51 prior to injecting a third liquid adhesive material 61 into the troughs 67*a–d* through trough passageways 68. It is preferred that each of the troughs 67*a–d* be sufficiently larger than the lugs 62*a–d* to permit movement of about 3.18 mm (0.125 inch) in each direction. The inner surface of the troughs 67 is formed by the outer surface of the yoke 31.

A third hardened adhesive material 69 substantially fills the troughs 67*a–d* around each of the lugs 62*a–d* and also contacts the outer surface of the yoke 31 at the inner side of the troughs 67*a–d* thereby rigidly fixing the yoke 31 in the housing 63.

One advantage of the novel method is that the platform can be adhered to the funnel in relatively short periods of time, developing sufficient strength from the solidified thermoplastic masses to permit accurate mounting of components thereon. This permits rapid mass-production methods to be used in the assembly. While the yoke-tube assemblies pass through further assembly steps up to the time they are placed into television receivers or other chassis, the irreversibly-hardenable masses continue to cure, developing great strength and rigidity. By the time the yoke-tube assembly is placed in a chassis, the yoke is no longer subject to displacement with respect to the tube due to plastic flow of adhesive.

The selection of the two adhesives is important to the novel method. The thermoplastic adhesive may be any of the thermoplastic adhesives mentioned in, or similar to the thermoplastic adhesives mentioned in, the above-cited Shrader patent. It is preferred to use hot-melt adhesives which melt above 125° C and can be dispensed or injected into the platform at about 190° to 215° C. Preferred hot-melt adhesives are Versalon 1138 and TPX 883 polyamide thermoplastics marketed by General Mills Chemicals, Inc., Minneapolis, Minn.

The irreversibly-hardenable or curable adhesive may be selected from the large number of known adhesives of this type. Since this adhesive after curing is both strong and rigid, it is desirable to select those adhesives whose dimensional changes so match those of the platform and the funnel that no delamination, or spalling or loss of adherence occurs as a result of the curing step. Silicone adhesives are preferred. Some preferred silicone adhesives are the following commercially-available RTV adhesive sealants: Silastic 732, Silastic 891, and Silastic 3145 each marketed by Dow Corning Corp., Midland, Mich.; and RTV-108 marketed by Silicone Products Dept., General Electric Co., Waterford, N.Y.

The irreversibly-hardenable adhesive may be squeezed from a tube in which it is packaged directly into the lug of the platform. Or the adhesive may be mixed and then injected with a syringe or a dispensing nozzle. It may also be applied into the recess of the ring just before the ring is positioned on the funnel. In another embodiment using the platform shown in FIG. 3, four masses of a very viscous form of irreversibly-hardenable adhesive are applied in the recess 54 between the two weep holes 71 between each pair of lugs. The platform 51 is then pressed into position against the external surface of the funnel. With the platform 51 held in this position, liquid thermoplastic adhesive is injected through the passageways 59*a–d* of each of the four lugs to form four masses of thermoplastic adhesive in the chamber 60. The thermoplastic adhesive is solidified giving temporary but adequate strength and rigidity so that subsequent manufacturing operations can be carried out while the irreversibly-hardenable adhesive cures to strong, rigid, adhesive masses.

We claim:

1. In a method for mounting an electronic component on an external surface of a cathode-ray tube comprising a. positioning a platform against said surface of said tube, b. applying at least one liquid thermoplastic mass between said platform and said surface, c. applying at least one liquid irreversibly-hardenable mass between said platform and said surface, d. solidifying said thermoplastic mass, e. mounting said electronic component on said platform after said thermoplastic mass has hardened, f. and completing the curing of said permanently-hardenable mass after said electronic component is mounted on said platform.

2. In the method defined in claim 1, the steps of injecting a plurality of liquid thermoplastic masses and an equal plurality of liquid irreversibly-hardenable masses between said platform and surface in alternating positions around said tube.

3. An article of manufacturing comprising, a. a cathode-ray tube, b. a platform adhesively held to the external surface of said tube, c. a magnetic deflection yoke in operational relationship with said tube and supported on said platform, d. at least two masses of adhesive between said platform and said surface, wherein at least one mass is of a solidified thermoplastic adhesive and at least one mass is an irreversibly - hardened adhesive, said thermoplastic mass alternating with said permanently hardened mass around said tube.

4. The article defined in claim 3 comprising a plurality of masses of solidified thermoplastic adhesive material between said platform and said surface and an equal plurality of irreversibly — hardened adhesive masses between said platform and said surface.

5. The article defined in claim 4 wherein said plurality is two.

6. The article defined in claim 4 wherein said plurality is four.

* * * * *